(12) United States Patent
Heaton (10) Patent No.: US 7,538,547 B2
(45) Date of Patent: May 26, 2009

(54) METHOD AND APPARATUS FOR INTEGRATING NMR DATA AND CONVENTIONAL LOG DATA

(75) Inventor: Nicholas Heaton, Den Haag (NL)

(73) Assignee: Schlumberger Technology Corporation, Sugar Land, TX (US)

( * ) Notice: Subject to any disclaimer, the term of this patent is extended or adjusted under 35 U.S.C. 154(b) by 116 days.

(21) Appl. No.: 11/616,207

(22) Filed: Dec. 26, 2006

(65) Prior Publication Data

US 2008/0154509 A1  Jun. 26, 2008

(51) Int. Cl.
*G01V 3/00* (2006.01)
(52) U.S. Cl. ...................... 324/303; 324/307
(58) Field of Classification Search ............... 324/303, 324/307
See application file for complete search history.

(56) References Cited

U.S. PATENT DOCUMENTS

| | | | |
|---|---|---|---|
| 6,115,671 A * | 9/2000 | Fordham et al. ............ 702/8 |
| 6,229,308 B1 | 5/2001 | Freedman | |
| 6,346,813 B1 | 2/2002 | Kleinberg | |
| 6,703,832 B2 | 3/2004 | Heaton et al. | |
| 7,075,297 B2 * | 7/2006 | Freedman ................ 324/303 |
| 7,196,517 B2 * | 3/2007 | Freedman ................ 324/306 |
| 7,253,617 B1 * | 8/2007 | Chen et al. ............... 324/303 |
| 2003/0006768 A1 * | 1/2003 | Kleinberg et al. .......... 324/303 |
| 2004/0032257 A1 * | 2/2004 | Freedman ................ 324/303 |
| 2004/0055745 A1 * | 3/2004 | Georgi et al. ........ 166/250.02 |
| 2004/0169511 A1 | 9/2004 | Minh et al. | |
| 2005/0270023 A1 * | 12/2005 | Freedman ................ 324/303 |

OTHER PUBLICATIONS

Wahl, J.S. et al., The Dual Spacing Formation Density Log, Journal of Petroleum Technology, Dec. 1964, pp. 1411-1415.
Akkurt, R. et al., NMR Logging of Natural Gas Reservoirs, SPWLA 36th Annual Logging Symposium, Jun. 26-29, 1995.

* cited by examiner

*Primary Examiner*—Brij B. Shrivastav
*Assistant Examiner*—Megann E Vaughn
(74) *Attorney, Agent, or Firm*—Darla P. Fonseca; Jaime Castano; Dale Gaudier (57) ABSTRACT

A method to determine one or more properties of a substance in a downhole region of investigation is disclosed. The method includes obtaining NMR measurements from the region of investigation, obtaining at least one additional well log measurement from the region of investigation, expressing the NMR measurements in terms of NMR subcomponents, expressing the additional well log measurement in terms of well log subcomponents, and simultaneously inverting the expressed NMR measurements and the expressed additional well log measurement for the NMR subcomponents to yield one or more properties of a substance.

19 Claims, 7 Drawing Sheets

METHOD AND APPARATUS FOR INTEGRATING NMR DATA AND CONVENTIONAL LOG DATA

BACKGROUND OF INVENTION

Almost all oil and gas produced today comes from accumulations in the pore spaces of reservoir rocks—usually sandstones, limestones, or dolomites. The amount of oil and gas contained in a unit volume of the reservoir is the product of its porosity and the hydrocarbon saturation. In addition to porosity and hydrocarbon saturation, the volume of the formation containing hydrocarbon is needed in order to estimate total reserves. Knowledge of the thickness and the area of the reservoir is needed for computation of its volume. To evaluate the producibility of a reservoir, it is necessary to know how easily fluid can flow through the pore system. This property of the formation rock, which depends upon the manner in which the pores are interconnected, is its permeability. Thus the main pertophysical parameters needed to evaluate a reservoir are its porosity, hydrocarbon saturation, thickness, area, and permeability.

Unfortunately, few of these pertophysical parameters can be measured directly. Instead, they must be derived or inferred from the measurement of other physical parameters of the formations. They include, among others, resistivity, the bulk density, hydrogen content (also known as hydrogen index), the natural radioactivity, response to magnetization, the spontaneous potential, etc.

Logging is the process of gathering and recording geological information from deep within the earth. A log (or well log) is a measurement versus depth or time, or both, of one or more physical quantities in or around a well. Wireline logs are taken downhole, transmitted through a wireline to surface and recorded there. Measurements-while-drilling (MWD) and logging-while-drilling (LWD) logs are also taken downhole. They are either transmitted to surface by mud pulses (transmitting pressure pulses in the mud), or else recorded downhole and retrieved later when the instrument is brought to surface. A logging tool carries out measurements from which petrophysical properties of the earth in its vicinity can be derived. This process is often called well log analysis or formation evaluation.

Various logging tools are employed, either separately or in combination, to gather logs of the aforementioned formation parameters. For example, since resistivity of oil and gas is much higher than that of water with dissolved salts, oil soaked rock generally has a higher resistivity than water soaked rock. Thus, a resistivity log can give an indication of what is in the ground. The following paragraphs briefly introduce a few logging tools.

Density logs are primarily used as porosity logs. A radioactive source, applied to the borehole wall, emits medium-energy gamma rays into the formations. These gamma rays may be thought of as high-velocity particles that collide with the electrons in the formation. At each collision a gamma ray loses some, but not all, of its energy to the electron, and then continues with diminished energy. This type of interaction is known as Compton-scattering. The scattered gamma rays reaching the detector, at a fixed distance from the source, are counted as an indication of formation density. See J. S. Wahl, et al., *The Dual Spacing Formation Density Log*, J. Pet. Tech., December 1964.

The number of Compton-scattering collisions is related directly to the number of electrons in the formation. Consequently, the response of the density tool is determined essentially by the electron density (number of electrons per cubic centimeter) of the formation. Electron density is related to the true bulk density, $\rho$, which in turn depends on the density of the rock matrix material, the formation porosity, and the density of the fluids filling the pores. A density well log measurement may be expressed in the form shown below in Equation (1);

$$\rho = \rho_{wat}\nu_{wat} + \rho_{oil}\nu_{oil} + \rho_{gas}\nu_{gas} + \rho_m(1 - \nu_{wat} - \nu_{oil} - \nu_{gas}) \quad (1)$$

where the density, $\rho$, is the bulk density measured by the well log tool, and $\rho_{wat}$, $\rho_{oil}$, $\rho_{gas}$, and $\rho_m$ are the average densities of water, oil, gas, and the formation, respectively. Although density logs are quite effective in analyzing the formation porosity, errors may enter the well log analysis due to the presence of shale, and due high fluid pressure.

Another example of a logging tool is a conductivity logging tool. This tool sends a current through the formation and measures the developed voltage. The ratio of the measured current and voltage gives the conductivity of the formation. Conductivity has units of siemens per meter. Most formations logged for potential oil and gas saturation are made up of rocks which, when dry, will not conduct an electric current; i.e., the rock matrix has almost zero conductivity and very high resistivity. An electrical current will flow only through the interstitial water saturating the pore structure of the formation. Conductivity measurements are essential for saturation determinations. Conductivity measurements, along with porosity and water resistivity, are used to obtain values of water and hydrocarbon saturation. The following equation may be used in connection with data obtained from a conductivity tool:

$$C_{XO} = C_{mf} \nu_{wat}^m \quad (2)$$

where $C_{XO}$, $C_{mf}$, and $\nu_{wat}^m$, are the conductivity at a given water saturation conductivity of mud filtrate, and volume of water in the mud formation, respectively. The exponent m is an empirical constant.

Yet another example of a well log measurement is nuclear magnetic resonance (NMR). NMR logs are used for porosity determination, permeability estimation, and fluid characterization. The primary NMR measurement is porosity. The NMR signal amplitude is directly proportional to the amount of hydrogen in the fluids in the formation. Since the fluids fill the pore space, this amplitude constitutes a direct measure of formation porosity, provided that all fluids have the same hydrogen index. In fact, many liquids encountered in oil reservoirs do have comparable hydrogen indices. Gas, condensates, and some light oils, on the other hand, typically have low hydrogen indices, and contribute lower NMR amplitudes than equivalent volumes of water or black oils. Gas zones can often be identified by comparing the NMR log with a density or sonic porosity. An example of the representation of the NMR porosity log measurement is shown in the following equation:

$$MRP = HI_{wat}\nu_{wat} + HI_{oil}\nu_{oil} + HI_{gas}\nu_{gas} \quad (3)$$

where, $HI_{wat}$, $HI_{oil}$, and $HI_{gas}$ are the hydrogen indices of water, oil, and gas, respectively; and $\nu_{wat}$, $\nu_{oil}$, and $\nu_{gas}$ are the fluid volumes of water, oil, and gas, respectively.

All the above well log tools and their measurements can be labeled as conventional well log tools and conventional well log measurements, respectively. The following paragraphs briefly describe the Nuclear Magnetic Resonance (NMR) tool.

Modern NMR logging tools use large permanent magnets to create a strong static magnetic polarizing field inside the formation. The hydrogen nuclei of water and hydrocarbons are electrically charged spinning protons that create weak magnetic fields—like tiny bar magnets. When the strong external magnetic field from the logging tool passes through a formation containing fluids, these spinning protons align themselves like compass needles along the magnetic field. This process, called polarization, increases exponentially with a time constant, T1, as long as the external magnetic field is applied. A magnetic pulse from the antenna rotates, or s the aligned protons into a plane perpendicular, or transverse, to the polarization field. These tipped protons immediately start to wobble or precess around the direction of the strong logging-tool magnetic field.

The precession frequency, called the Larmor frequency, is proportional to the strength of the external magnetic field. The precessing protons create an oscillating magnetic field, which generate a weak radio signal at this frequency. The total signal amplitude from all the precessing hydrogen nuclei (typically a few microvolts) is a measure of the total hydrogen content, which is a measure of porosity of the formation.

The rate at which the proton precession decays is called the transverse relaxation time, T2, and is the second key NMR measurement because it is related to the pore-size distribution. T2 measures the rate at which the spinning protons lose their alignment within the transverse plane. It depends on three factors: the intrinsic bulk-relaxation rate in the fluid; the surface-relaxation rate, which is an environmental effect; and relaxation from diffusion in a field gradient which is a combination of environmental and tool effects. There is no diffusion contribution to T1.

The spinning protons will quickly lose their relative phase alignment within the transverse plane because of variations in the static magnetic field. This process is called the free induction decay (FID), and the Carr-Purcell-Meiboom-Gill (CPMG) pulse-echo sequence is used to compensate for the rapid free-induction decay caused by reversible transverse dephasing effects.

The three components of the transverse relaxation time play a significant role in the use of the T2 distribution for well logging applications. For example, the intrinsic bulk relaxation time is caused principally by the magnetic interactions between neighboring spinning protons in the fluid molecules. These are often called spin-spin interactions. Molecular motion in water and light oil is rapid, so the relaxation in large pores is inefficient with correspondingly long decay-time constants. However, as liquids become more viscous, the molecular motion is slower. Then the spin-spin interactions become much more efficient. Thus, tar and viscous oils can be identified because they have shorter T2 decay times than light oil or water.

Fluids near or in contact with grain surfaces relax at a much higher rate than the bulk fluid relaxation rate. Because of complex atomic level electromagnetic field interactions at the grain surface there is a high probability that the spinning proton in the fluid will relax when it encounters a grain surface. For the surface relaxation process to dominate the decay time, the spinning protons in the fluid must make multiple encounters with the surface, caused by Brownian motion, across small pores in the formation. They repeatedly collide with the surface until a relaxation event occurs. The resulting T2 distribution leads to a natural measure of the pore-size distribution.

The approach described above comes from early generation NMR logging tools which typically measure simple echo trains that only reflect T2 distributions. The latest generation NMR tools acquire more complex datasets that contain information not only about T2 distributions but also about T1 distributions (longitudinal relaxation time) and molecular diffusion rates, D. These properties—in particular molecular diffusion rates—are highly dependent on the fluid types, as explained below.

Relaxation from diffusion is a technique frequently used to differentiate oil from gas. See R. Akkurt et al., *NMR Logging of Natural Gas Reservoirs*, The Log Analyst, no. 6 November-December 1996. Between spin-flipping pulses, some protons will drift—due to their Brownian motion—from one region to another of different field strength, which changes their precession rate. As a result, they will not receive the correct phase adjustment for their previous polarization environment. This leads to an increase in the observed transverse dephasing relaxation rate. Gas has relatively high mobility compared with oil and water, and therefore, the spinning protons in gas have a much larger diffusion effect.

The preceding paragraphs described various logging techniques that can be used for formation evaluation. Once the data are collected they are usually input to a data processing unit that performs log analysis. An important objective of all log analysis is to determine the mineral and fluid volumes that constitute the earth formation as a function of depth. This is achieved by analyzing a plurality of log measurements (multi-tool analysis). In general, the physical properties measured by the tools are not the fluid or mineral volumes themselves. Log analysis is then performed by first expressing each logging tool response in terms of the volumes, and then computing the set of volumes that provide the overall best agreement between the computed tool responses and the actual measured values.

For each tool, the physical properties submitted to the log analysis are themselves derived by previous processing of raw data such as count rates (gamma ray log), voltage amplitudes, frequencies, and signal phase differences. For NMR tools, the pre-processing stage involves calibration (in terms of NMR volume fractions) of echo amplitudes and the mathematical inversion of echo amplitude decays to provide T2 (transverse relaxation time) distributions. The quantity eventually submitted to the multi-tool analysis is the NMR porosity, which is the sum of the amplitudes in the T2 distribution. In some cases a NMR bound fluid volume, computed as the sum of T2 distribution components falling below a specified T2 cutoff value, is also given as an input to the analysis. The NMR porosity and bound fluid volumes are related to the formation fluid volumes by the respective fluid hydrogen indices.

However, current multi-tool log analysis techniques take no account of diffusion effects on the transverse relaxation time. Instead, NMR fluid analysis is performed independently and results are then compared with the results of conventional multi-tool analysis. Although this approach is useful in environments where conventional methods may be inaccurate (e.g., low resistivity pay), in many other cases it does not take full advantage of all the available data.

Mathematical inversion of NMR data takes NMR properties (namely relaxation times T1 and/or T2 and Diffusion D) and relates these properties to specific fluids. Two types of NMR inversion have been proposed for diffusion-based NMR logs. The first type is a model-based approach, one example of which is the Magnetic Resonance Fluid (MRF) characterization method as described in U.S. Pat. No. 6,229, 308 issued to Freedman et al. This method involves making multiple NMR measurements with different parameters and simultaneously analyzing all the data in an inversion. The MRF method invokes the Constituent Viscosity Model (CVM), which relates relaxation time and diffusion rates to phenomenological constituent viscosities whose geometric mean is identical to the macroscopic fluid viscosity. In addition to fluid volumes, the method provides estimates of the oil viscosity. The MRF technique represents the most comprehensive and accurate method currently available for NMR fluid characterization in well logging. Unlike previous methods, the MRF method is applicable to any suite of NMR measurements and is not limited to CPMG sequences and is commonly applied to diffusion editing (DE) measurements.

The second type of inversion is independent of any fluid model. Instead, the 3D-NMR method, as described in Chanh Cao Minh et al., *Planning and Interpreting NMR Fluid-Characterization Logs*, SPE paper 84478, presented at the SPE Annual Technical Conference and Exhibition, 5-8 Oct. 2003, Denver, Colo.; and Nicholas J. Heaton et al, *Saturation and Viscosity from Multidimensional Nuclear Magnetic Resonance Logging*, SPE paper 90564, presented at the SPE Annual Technical Conference and Exhibition, 26-29 Sep. 2004, Houston, Tex., provides a graphical representation of the NMR responses in the form of cross-plots (often referred to as maps) of NMR properties such as D vs. T2 or D vs. T1. By inspecting these D-T1 and D-T2 maps it is often possible to identify different fluids and assign NMR responses to them based on the location of the corresponding peaks in the maps. Fluid volumes can be computed either by direct integration of the peak amplitudes if the peaks are well-resolved or by applying deconvolution methods (equivalent to MRF analysis) if they are not.

An alternative approach to NMR fluid-typing involves the comparison of different measurements acquired at different depths of investigation (See U.S. Pat. No. 6,703,832 issued to Heaton et al.). This method exploits the variation in fluid saturations at different depths of investigation caused by invading mud filtrate. In general, deeper measurements are more likely to sense native fluids while shallower measurements sense a greater proportion of filtrate. Because the filtrate NMR response is generally known, differences in NMR response between the two sets of measurements provide an indication of the fluid type at the deeper depth of investigation.

All of the techniques described above rely on measuring NMR properties, namely relaxation times and diffusion rates and relating these properties to specific fluids. The principal attractions of the NMR methods are (a) that they can function in environments where conventional resistivity-based saturation analysis is unsuitable or inaccurate (eg. low contrast or low resistivity pay), and (b) that they can also provide information on oil viscosity. The extended range of viscosity estimate derived from combined NMR data has significant potential in heavy oil reservoirs.

SUMMARY OF INVENTION

In some aspects, embodiments of the invention relate to a method for determining one or more properties of a substance in a downhole region of investigation comprising: obtaining NMR measurements from the region of investigation; obtaining at least one additional well log measurement from the region of investigation; expressing the NMR measurements in terms of NMR subcomponents; expressing the at least one additional well log measurement in terms of well log subcomponents; and simultaneously inverting the expressed NMR measurements and the expressed at least one additional well log measurement for the NMR subcomponents to yield the one or more properties.

In some aspects, embodiments of the invention relate to a logging system, comprising: a downhole tool adapted to be disposed within a wellbore, wherein the downhole tool comprises: an NMR measurement tool configured to obtain NMR measurements within an investigation region, and at least one additional well log measurement tool configured to obtain at least one additional well log measurement within the investigation region; and a processing system configured to: express the NMR measurements in terms of NMR subcomponents, express the well log measurement in terms of well log subcomponents, and invert the expressed NMR measurements together with the expressed at least one additional well log measurement.

Other aspects and advantages of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 1:
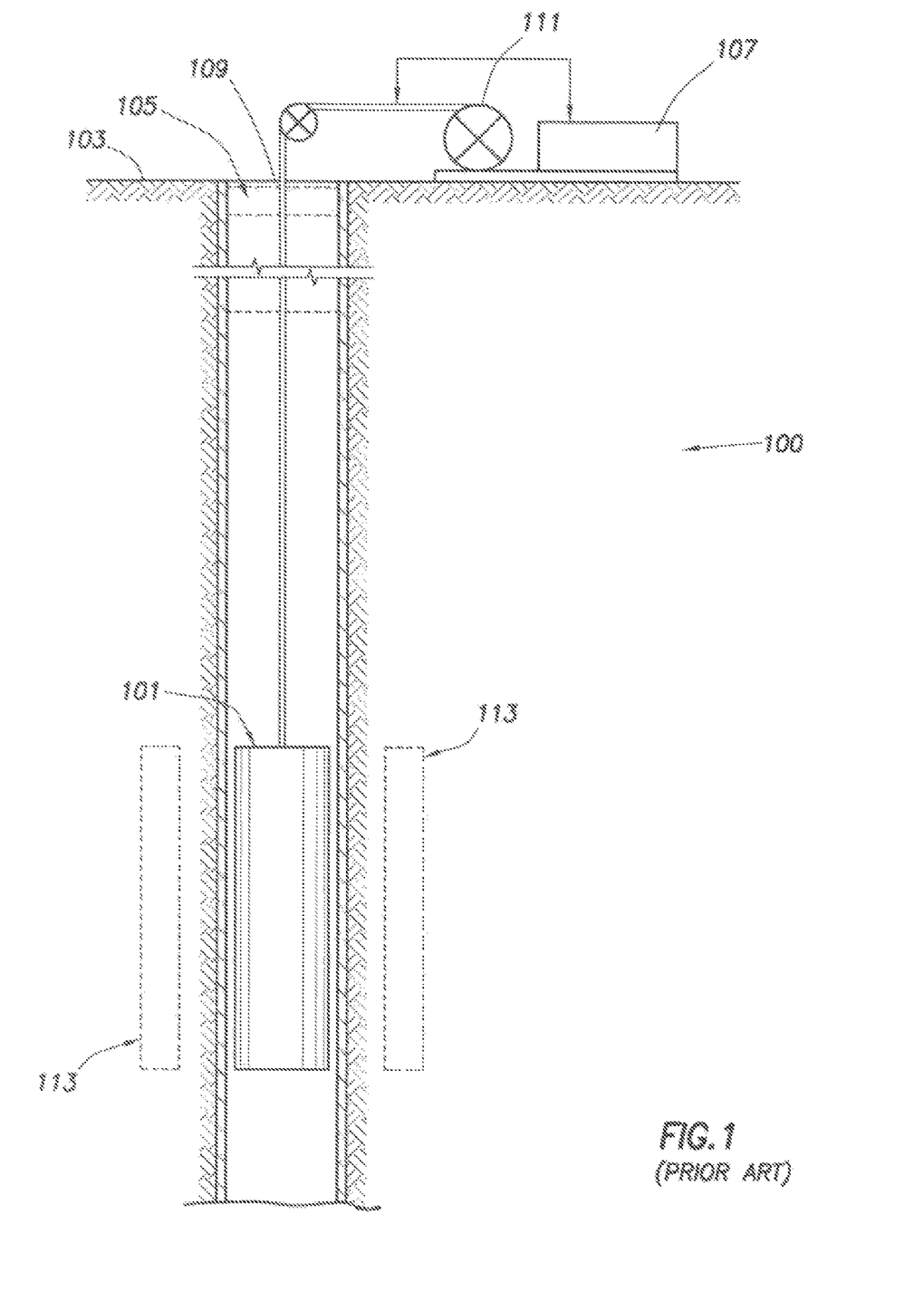
FIG. 1 shows a conventional logging system as known in the prior art.

FIG. 1 illustrates a schematic diagram of a conventional logging system (100). A downhole tool (101) is suspended in wellbore (105) by a cable (109), and disposed proximate an investigation region (113) from which data are to be obtained. The cable length is used to control depth and thus is controlled by suitable means at the surface (103) such as a drum and winch mechanism (111). Surface equipment (107), placed at a surface location, can be of a conventional type and can include a processing system. The cable (109) may include a communication link configured to transfer data between the downhole tool (101) and the processing system at the surface equipment (107). The communication system may be of an electrical, mechanical or electro-mechanical type, and may comprise copper wire, fiber-optic cable, etc.

Figure 2:
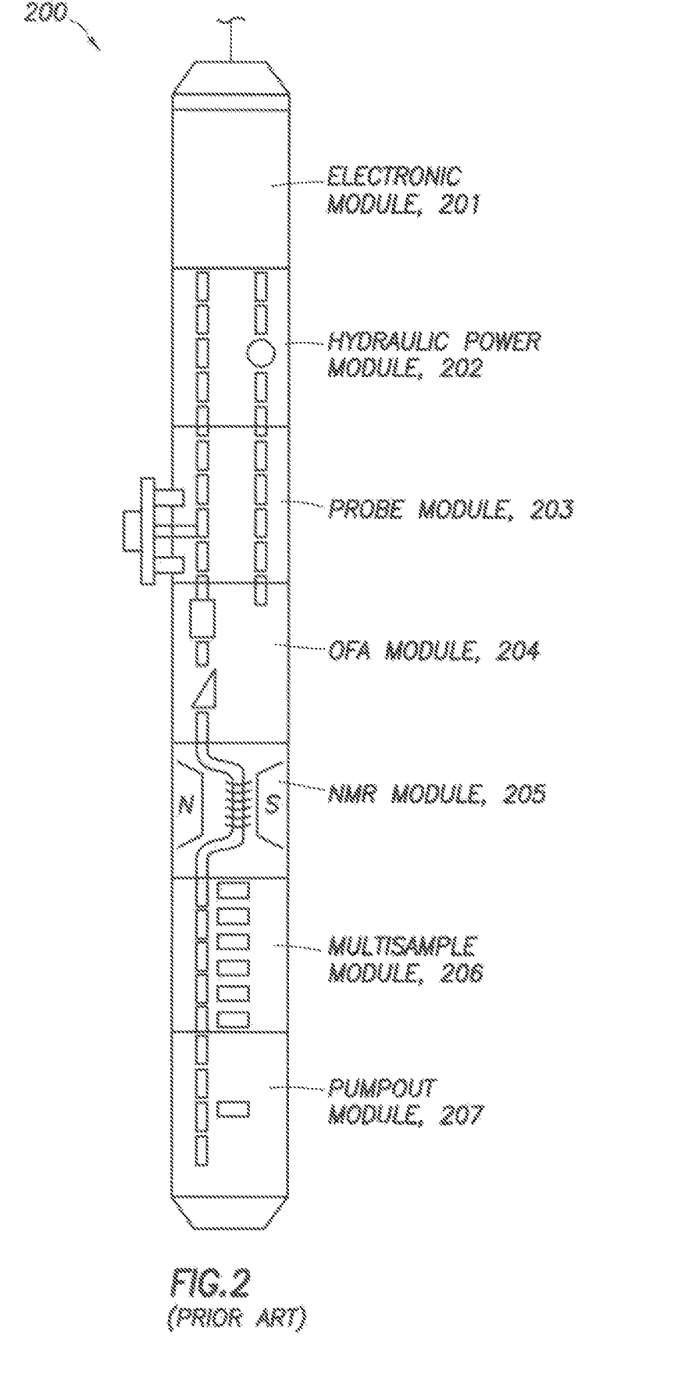
FIG. 2 shows a downhole tool including an NMR tool and at least one additional logging tool as known in the prior art.

FIG. 2 shows a conventional downhole tool (200) as disclosed in U.S. Pat. No. 6,346,813 issued to Kleinberg. The downhole tool (200) includes the following modules: an electronic module (201) which may include a processing system; a hydraulic power module (202); a probe module (203) which may be deployed to make a hydraulic seal with the formation; an optical fluid analyzer (OFA) module (204); a NMR module (205) which may collect NMR data that includes diffusion, transverse relaxation time and longitudinal relaxation time information; a multisample module (206) which may include additional logging tools such as, but not limited to, density, conductivity, sonic, neutron porosity, gamma ray, etc.

One embodiment of the invention relates to integration of NMR data that include both diffusion and relaxation time information with conventional log measurements. This approach takes into account all the available information to allow better understanding of the fluids within the formations.

Figure 3:
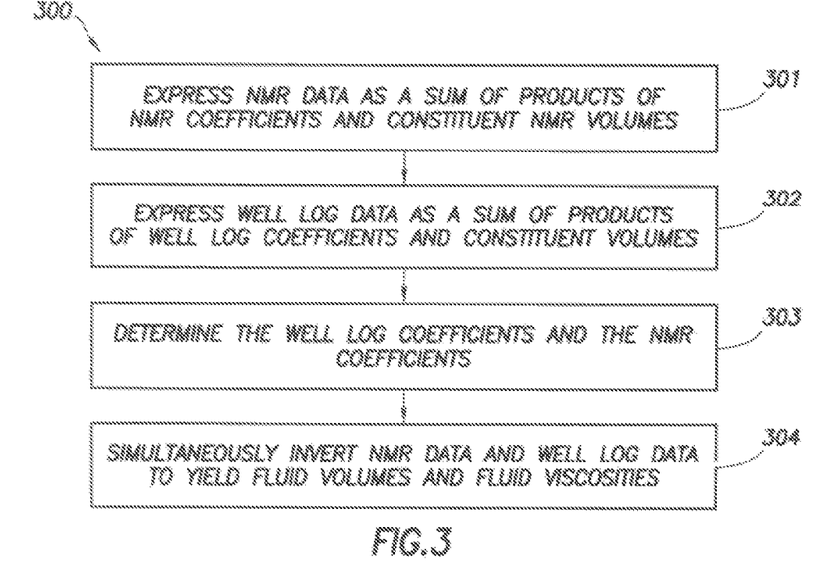
FIG. 3 shows a flow diagram of a method for integrating NMR data with other log measurements in accordance with an embodiment of the invention.

FIG. 3 shows a flow diagram (300) of a method for integrating NMR data and log data in accordance with an embodiment of the invention. NMR data, containing diffusion and relaxation time information, is expressed as a sum of NMR subcomponents. The following equations express the individual NMR echoes as a summation of products of the NMR coefficients and NMR volumes, the products being the NMR subcomponents.

where k is the echo index, TE is the echo spacing, $\gamma$ is the gyromagnetic ratio, and G is the magnetic field gradient. For purposes of explanation, Equation set (4) and Equation (5) have been simplified to omit any dependence on longitudinal relaxation time, T1, implying that all measurements are assumed to be fully polarized. A more general expression including a polarization term could be equally used. This would require a third NMR property, T1 (or T1/T2 ratio) in the NMR coefficient.

The NMR volumes, $V(T2_i, D_j)$, are proportional to the fluid volume and the fluid hydrogen index. Note that Equation set (4) gives a general form of analyzing NMR measurements. If the method used to invert the data does not use a fluid model for example, in U.S. patent application No. US2004/0169511 where NMR measurement is interpreted on a D-T2 map, then each NMR subcomponent in Equation set (4) may represent a pixel on the D-T2 map. Alternatively, if the inversion method assumes a fluid model, as in MRF method (Freedman '308), then the index j in $D_j$ may correspond to each of the fluids incorporated in the model, typically oil, water, gas and filtrate.

After expressing the NMR measurement data in the form depicted in Equation set (4), the method expresses at least one additional log measurement as a sum of products of log coefficients and constituent volumes (302). For example, the additional log measurement may include, but is not limited to, a density log, conductivity log, neutron log, sonic log, etc. Equations (1) and (2) may be expressed in the form of fluid volumes and well log coefficients as shown below:

$$\text{Echo}(1) = F(1; T2_1, D_1)V(T2_1 D_1) + F(1; T2_2, D_1)V(T2_2 D_1) + \ldots + F(1; T2_N, D_N)V(T2_N D_N) \quad (4)$$

$$\text{Echo}(2) = F(2; T2_1, D_1)V(T2_1 D_1) + F(2; T2_2, D_1)V(T2_2 D_1) + \ldots + F(2; T2_N, D_N)V(T2_N D_N)$$

$$\vdots = \vdots \quad \vdots \quad \vdots$$

$$\text{Echo}(n) = F(n; T2_1, D_1)V(T2_1 D_1) + F(n; T2_2, D_1)V(T2_2 D_1) + \ldots + F(n; T2_N, D_N)V(T2_N D_N)$$

Equation set (4) depicts echo amplitudes in terms of NMR coefficients. The NMR coefficient $F(k; T2_i, D_j)$ is given by the following equation:

$$F(k; T2_i, D_j) = \exp\left(\frac{-kTE}{T2_i}\right)\exp\left(\frac{-kTED_j\gamma^2 G^2 TE^2}{12}\right) \quad (5)$$

$$\rho_m - \rho = (\rho_m - \rho_{wat})v_{wat} + (\rho_m - \rho_{oil})v_{oil} + (\rho_m - \rho_{gas})v_{gas} \quad (6)$$

$$C_{XO}^{1/m} = C_{mf}^{1/m} v_{wat}^m \quad (7)$$

Equations (6) and (7) express various well log measurements directly in terms of true fluid volumes. Note that each expression is a sum of products of the well log coefficients and the fluid volumes. These equations are subsequently combined with the equations shown in the Equation set (4). Following is the result of one example of such combined analysis:

$$\text{Echo}(1) = F(1; T2_1, D_1)V(T2_1 D_1) + F(1; T2_2, D_1)V(T2_2 D_1) + \ldots + F(1; T2_N, D_N)V(T2_N D_N) \quad (8)$$

$$\text{Echo}(2) = F(2; T2_1, D_1)V(T2_1 D_1) + F(2; T2_2, D_1)V(T2_2 D_1) + \ldots + F(2; T2_N, D_N)V(T2_N D_N)$$

$$\vdots = \vdots \quad \vdots \quad \vdots$$

$$\text{Echo}(n) = F(n; T2_1, D_1)V(T2_1 D_1) + F(n; T2_2, D_1)V(T2_2 D_1) + \ldots + F(n; T2_N, D_N)V(T2_N D_N)$$

$$\rho - \rho_m = [\rho(T2_1, D_1) - \rho_m]v(T2_1, D_1) + [\rho(T2_2, D_1) - \rho_m]v(T2_2, D_1) + \ldots + [\rho(T2_N, D_N) - \rho_m]v(T2_N, D_N)$$

$$C_{XO}^{1/m} = C^{1/m}(T2_1, D_1)v(T2_1, D_1) + C^{1/m}(T2_2, D_1)v(T2_2, D_1) + \ldots + C^{1/m}(T2_N, D_N)v(T2_N, D_N)$$

Equation set (8) shows the combined NMR echo equations in addition to the log measurements expressed in terms of diffusion and relaxation time T2. Note the now modified density and conductivity measurements and the NMR measurements are associated with the same set of volumes. In addition, the NMR coefficient now takes into account the hydrogen index as shown in Equation (9):

$$F(k; T2_i, D_j) = HI(T2_iD_j)\exp\left(\frac{-kTE}{T2_i}\right)\exp\left(\frac{-kTED_j\gamma^2G^2TE^2}{12}\right) \quad (9)$$

In the subsequent step (303) of the method, the values of the well log coefficients are determined. Note that determining the values of the well log coefficients may be dependent on the inversion process employed. Once the well log and NMR coefficients are known, the only unknowns in the Equation set (8) are the fluid volumes.

The equations in Equation set (8) are simultaneous equations that are solved (304) to give fluid volumes and fluid viscosities. The solving may be a mathematical inversion that generates fluid volume and properties from the given data. Various inverting methods may be used. For example, the MRF method (Freedman '308), 3D-NMR, etc. The NMR measurements could also be represented by a more general expression involving T1 (or T1/T2) in addition to T2 and D. Alternatively, some combinations of NMR measurements could be expressed in terms of just D and T1.

In the embodiment of the method described by Equation set (8), all log measurements are expressed in terms of hypothetical fluids defined by their specific intrinsic properties, D, T2, and/or T1 (or T1/T2). The end-points in the system of equations are the NMR coefficients (for the echo amplitudes) and or bulk fluid properties (for the other log measurements). This approach may be termed the "NMR" approach, since it uses an inversion method similar to those used in NMR log processing. Alternatively, a "Conventional" approach may be followed in which all log measurements are expressed in terms of formation fluids and matrix properties. In this case, expressions such as the ones depicted by Equation (6) and Equation (7) are solved. NMR measurements can provide several equations to the system. In standard log analysis these are typically NMR porosity, and in some cases also bound fluid and free fluid. In the present invention, additional equations could be defined related to diffusion quantities obtained by analyzing the NMR log. For example a suitable linear equation for the logarithmic total diffusion rate is:

$$D_{LT} = v_{oil}\log(D_{oil}) + v_{gas}\log(D_{gas}) + v_{water}\log(D_{water}) \quad (10)$$

Alternative linear or non-linear equations for different diffusion quantities derived by analyzing NMR log data could also be defined.

Figure 4:
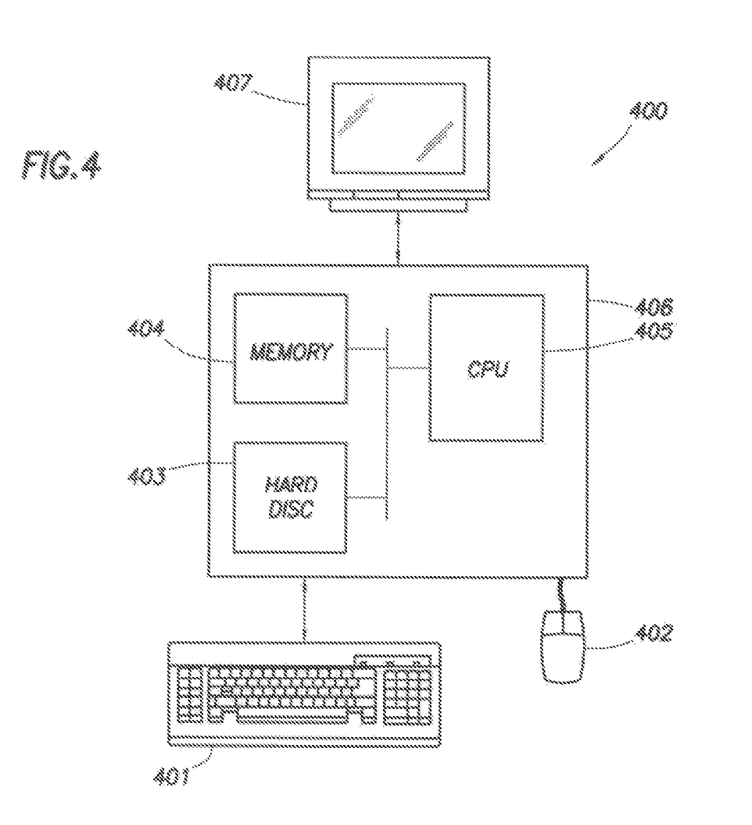
FIG. 4 shows a system for integrating NMR data and other log measurements in accordance with an embodiment of the invention.

FIG. 4 shows a system (400) for integrating NMR data and the data from at least one additional log in accordance with an embodiment of the invention. The system (400) includes input means such as a keyboard (401), mouse (402) and a hard disk drive (403). The input means are not limited to the aforementioned devices. The input means may also include PCMCIA cards, floppy disc drives, network connection, cables, or any other medium that allows data to be input to the computer. The NMR data and the well log data may be input to the computer with aid of these input means. The system (400) also includes processing means for processing the NMR data and the well log data input into the system (400). The processing means includes a central processing unit (CPU) (405). The processing means may execute a set of instructions that may be stored within the memory (404), the hard disk drive (403) or may be input into the system via any of the aforementioned input means. The CPU (405) executes instructions to express the NMR data as a summation of NMR subcomponents, where each NMR subcomponent is a product of NMR coefficient and constituent volumes. This processing may yield a result similar to the Equation set (4). The processing means also execute instructions to express the other well log measurements as a summation of well log subcomponents, where each well log subcomponent is a product of a well log coefficient and the constituent volumes. The result of this operation is similar to the Equation set (8). The processing means may also execute instructions to determine the coefficients in Equation set (8). The processing means may subsequently execute instructions that simultaneously invert the NMR data and the other well log measurements to yield fluid volumes and fluid viscosities. The fluids of interest may be water, oil, and gas.

The system (400) also has an output means, for example a display monitor (407), which displays the fluid volumes and fluid viscosities to a user. The output means also include, but is not limited to, a printer, a hard disk drive (403), memory (404), a network connection, etc. The system (400) also includes a user interface means to allow the user to select, for example, the required number of well log measurements to be included in the processing. The user interface means may include, but is not limited to, a mouse (402), a keyboard (401), etc. The user may s elect a well log measurement from any available measurements of density, resistivity, neutron porosity, sonic, etc. The user interface allows the user to select the type of well log measurement to be included in the combined NMR analysis. The user interface may also allow the user to modify, replace or alter the program display, the program flow and the program source.

Figure 5:
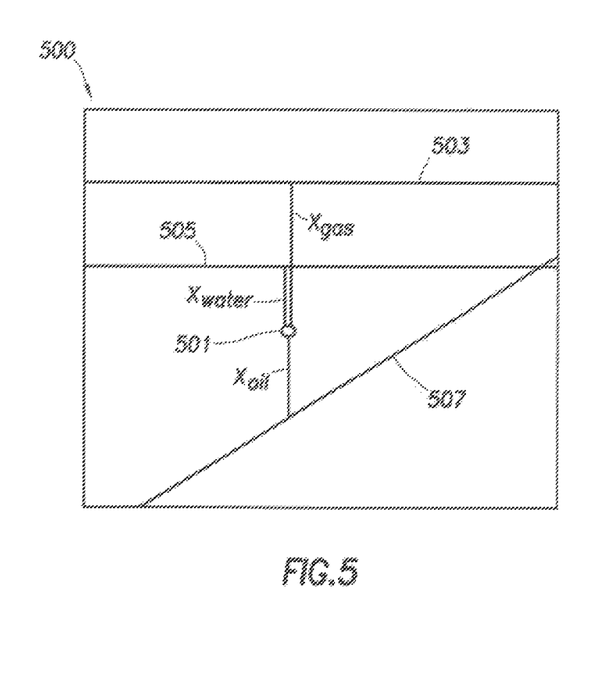
FIG. 5 shows an example for determining the NMR coefficients on a D-T2 map, in accordance with an embodiment of the invention.

FIG. 5 shows determining the well log coefficients on a D-T2 map in accordance with an embodiment of the invention. Each subcomponent in Equation set (8) represents a pixel value on the D-T2 map. The D-T2 map representation of the NMR data does not assume a fluid model; rather it provides a graphical representation of the NMR responses in the form of cross plots of NMR properties. U.S. Patent Application No. US2004/0169511 provides further information on D-T2 maps. In the map (500) shown in FIG. 5, the horizontal axis is defined by a logarithm of T2 values and the vertical axis is defined by a logarithm of diffusion constant values D. The horizontal axis and the vertical axis are called relaxation time axis and diffusion axis, respectively. Note that the relaxation time axis may also be defined by a logarithm of T1 values or some function of T1, T2 and a combination of T1 and T2 (for e.g., ratio of T1 and T2). The point (501) represents a pixel on row i and column j of the matrix representing the D-T2 map. The theoretical responses of water (505), oil (507), and gas (503) are overlaid on the maps. Distances $X_{wat}$, $X_{oil}$, and $X_{gas}$ are the distances of the point on the two dimensional map to the lines representing theoretical responses of water (505), oil (507), and gas (503), respectively. The coefficients (or end points) associated with each D, T2 component in Equation set (8) must be defined in order to solve the system of equations. This amounts to assigning each point of D-T2 space (or whichever NMR co-ordinates are used to define the distributions) to a specific fluid, water, oil or gas. One way to do this is illustrated in FIG. 5 and by the following equations:

$$\rho(T2_i, D_j) = \rho_{wat}\frac{(1/X_{wat})^2}{Z^2} + \rho_{oil}\frac{(1/X_{oil})^2}{Z^2}\rho_{gas}\frac{(1/X_{gas})^2}{Z^2} \quad (11)$$

$$C^{1/m}(T2_i, D_j) = C_{wat}^{1/m}\frac{(1/X_{wat})^2}{Z^2}$$

$$HI(T2_i, D_j) = HI_{wat}\frac{(1/X_{wat})^2}{Z^2} + HI_{oil}\frac{(1/X_{oil})^2}{Z^2}HI_{gas}\frac{(1/X_{gas})^2}{Z^2}$$

$$Z^2 = (1/X_{wat})^2 + (1/X_{oil})^2 + (1/X_{gas})^2$$

The coefficients (or end points) associated with each D-T2 map can be computed as weighted sums of the end points of the different fluids (water, oil, and gas) present. The map itself can be divided up in several different ways. The embodiment shown in FIG. 5 is based on squared distances from theoretical fluid responses. Various other approaches may be used to arrive at values for the well log coefficients. For example, the value of Z may also be computed as the algebraic mean of the absolute distances of the point from the theoretical fluid responses.

Figure 6A:
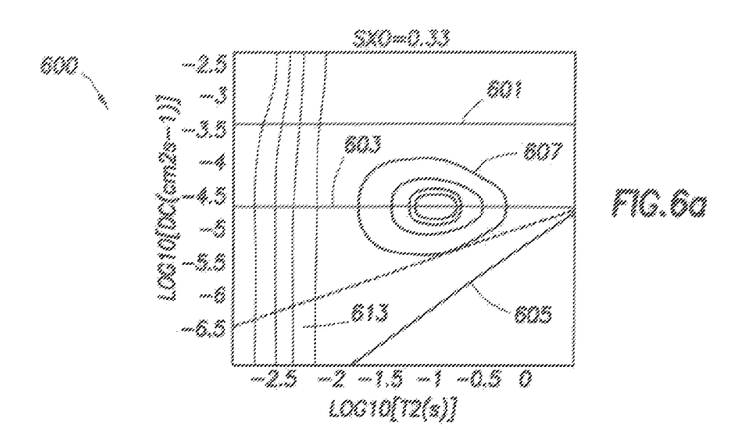
FIG. 6a-6f show D-T2 maps of conventional NMR data.
Figure 6B:
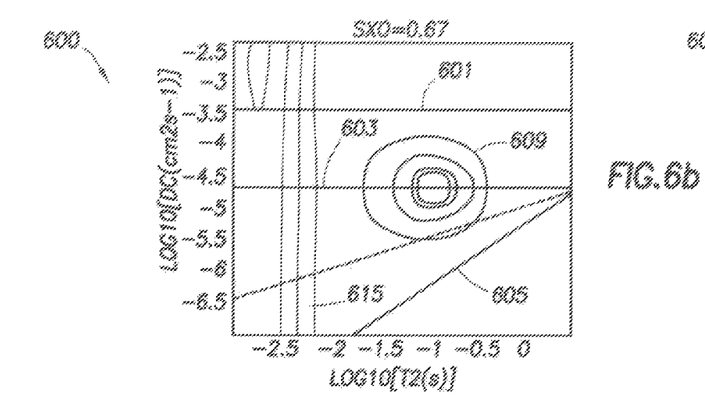
Figure 6C:
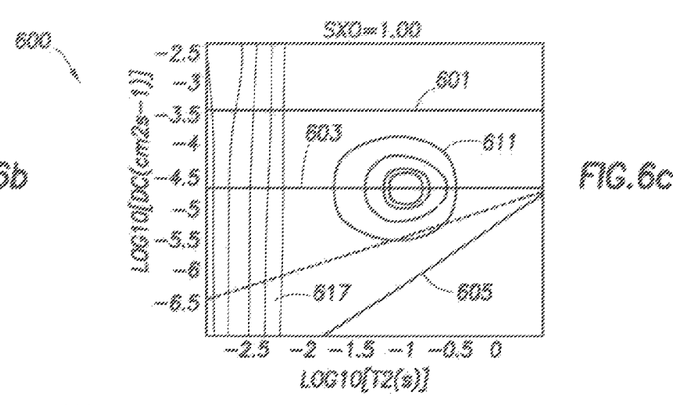
Figure 6D:
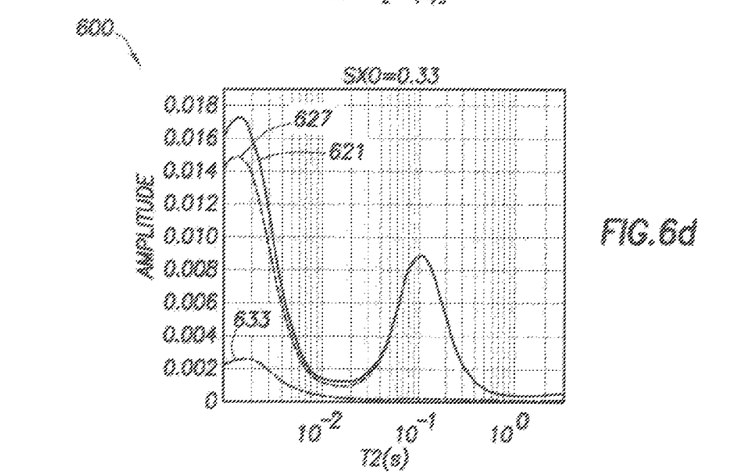
Figure 6E:
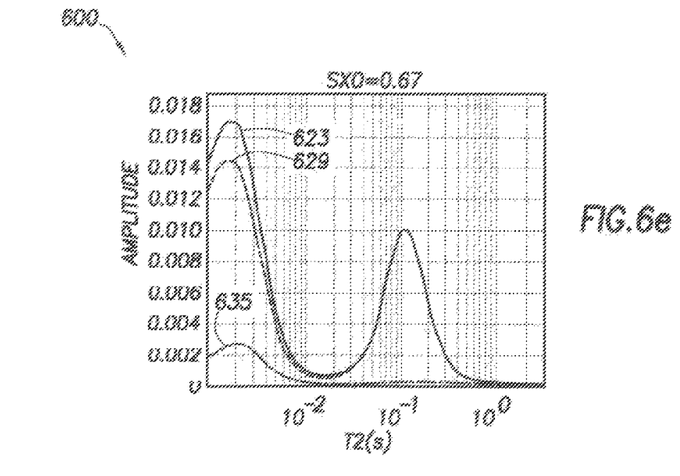
Figure 6F:
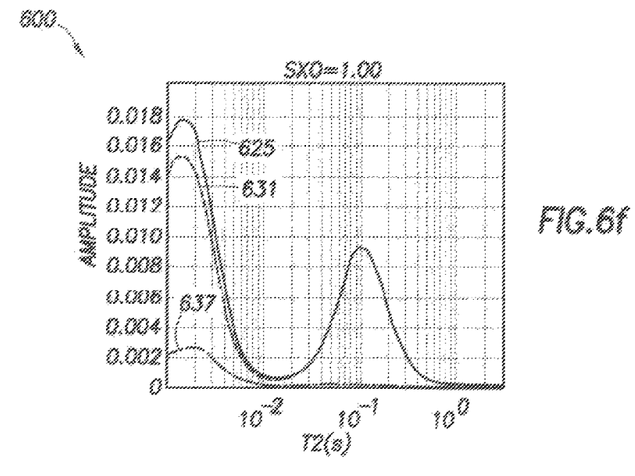

FIGS. 6a, 6b, and 6c show D-T2 maps obtained from simulated data comprising heavy oil and water with water saturations of 0.33, 0.67, and 1.00, respectively. FIGS. 6d, 6e, and 6f show inversion of the data represented in the D-T2 maps shown in FIGS. 6a, 6b, and 6c, respectively. These figures represent NMR analysis without including additional well log measurements. For example, NMR analysis of Equation set (4) may lead to similar results. Note that although the inversion method employed in the embodiment shown in FIG. 6 is 3D-NMR, any alternate inversion method, namely MRF, can also be used. The theoretical responses of gas, water, and oil are overlaid on the D-T2 maps; and are labeled as (601), (603), and (605), respectively. The inversion process converts the NMR data to T2 distributions corresponding to each theoretical fluid response (for gas, water, and oil, in this embodiment). For the water saturation value of 0.33, the T2 distributions of gas, water, and oil are labeled as (621), (627), and (633), respectively. Similarly, the T2 distributions of gas, water, and oil for a water saturation value of 0.67 are labeled as (623), (629), and (635), respectively. And finally, the T2 distributions corresponding to gas, water, and oil for maximum water saturation level of 1 are labeled as (625), (631), and (637), respectively.

The fluid instances (607), (609), and (611) lie on the theoretical water response line, and hence can be clearly identified as water. However, fluid instances (613), (615), and (617) show that for small values of T2, the NMR data does not provide reliable information to classify the fluid as either gas, water, or oil. In this particular example, the NMR analysis is unable to reliably discriminate between the heavy oil and small-pore/claybound water.

Figure 7A:
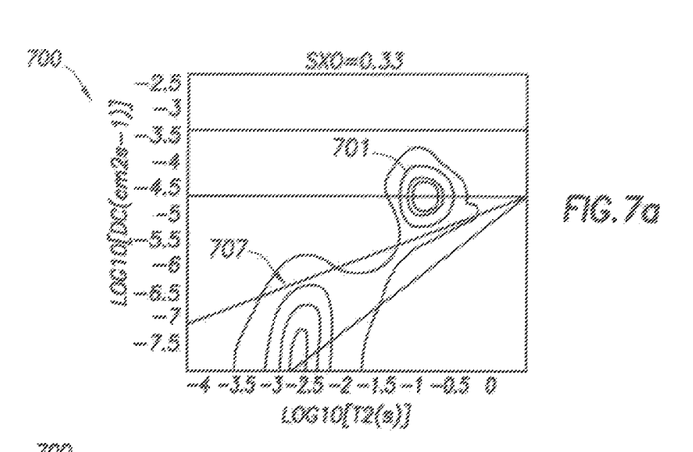
FIG. 7a-7f show D-T2 maps of NMR data combined with additional well log data in accordance with an embodiment of the invention.
Figure 7B:
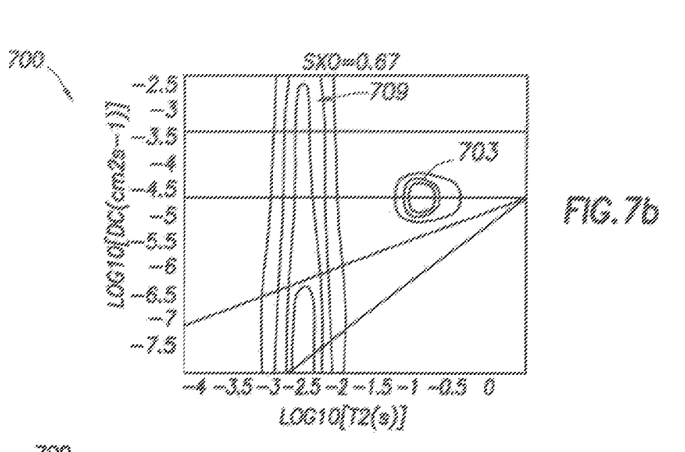
Figure 7C:
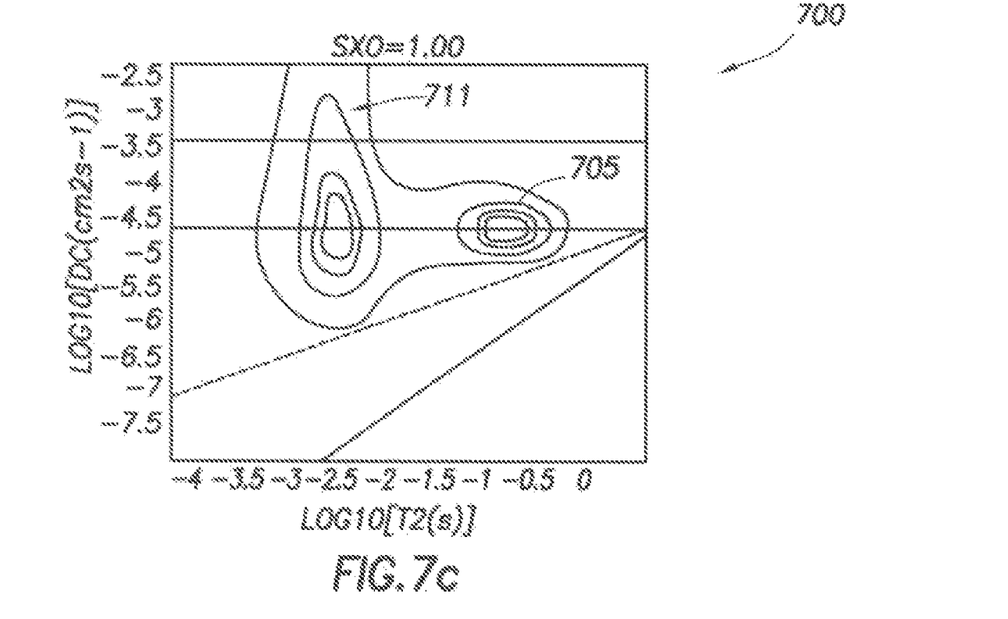
Figure 7D:
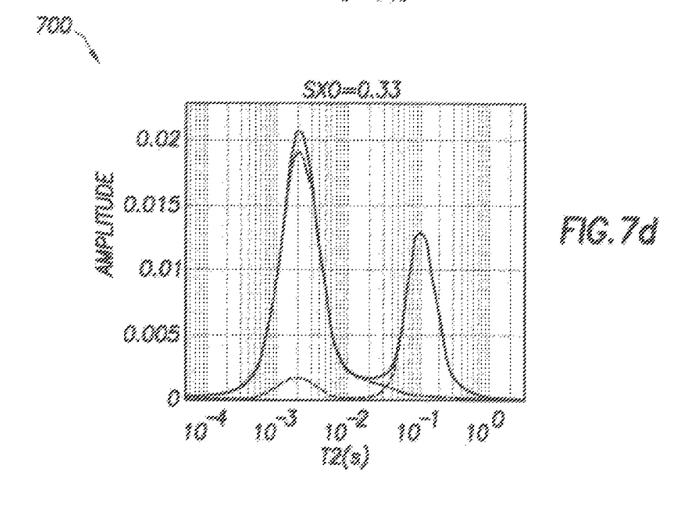
Figure 7E:
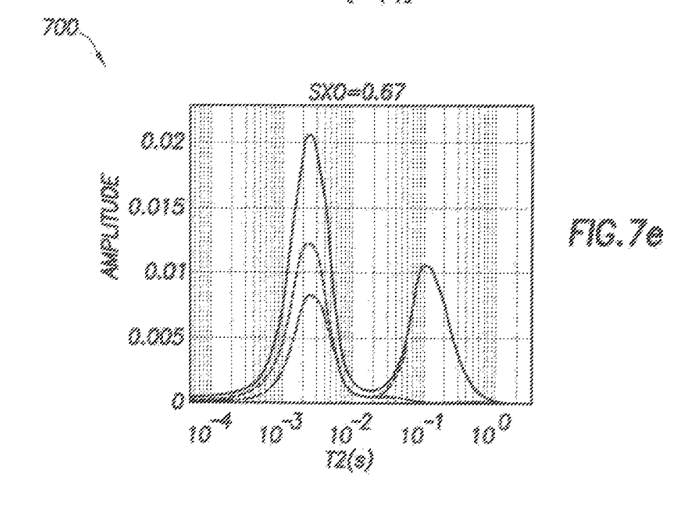
Figure 7F:
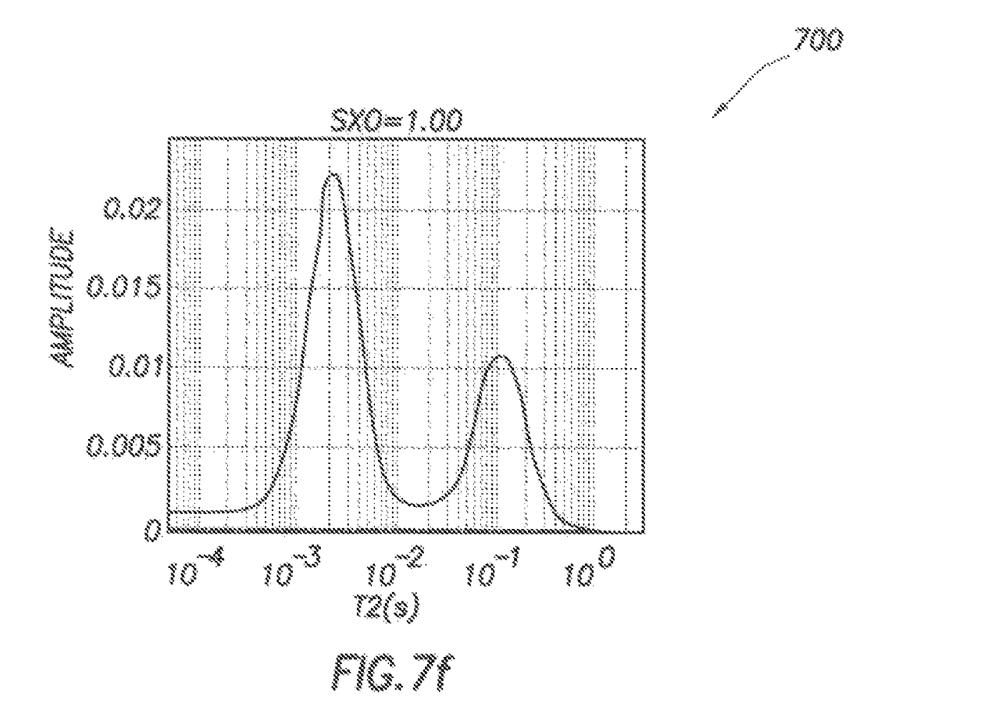

FIG. 7a-7c show the D-T2 maps for the same simulated data analyzed in FIG. 6a-6c, in accordance with an embodiment of the invention. However, in this case a resistivity measurement and a density measurement were also included in the combined analysis method of the invention. The combined analysis method is that shown in Equation set (8). Note that the inclusion of additional well log measurements enables the analysis to distinguish the water (711) and oil (707) signals reasonably well. The embodiment shown in FIG. 7a-7f extends the range of viscosity estimates derived from the NMR data. This extended range may allow a user to distinguish fluid instances more effectively as compared to standard NMR analysis. For example, the combined analysis can be employed to investigate heavy oil reservoirs in which conventional NMR performs poorly.

The invention may also include a computer readable medium that stores a program which is executable by a processor, and includes instructions for integrating NMR data with additional well log measurement of an investigation region. The computer readable medium may be, but is not limited to, a floppy disk, a hard disk drive, an optically readable medium, a flash memory, magnetic storage medium, etc.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method to determine the amount of a substance in a downhole region of investigation; comprising:
   obtaining NMR measurements from the region of investigation;
   obtaining at least one additional well log measurement from the region of investigation;
   expressing the NMR measurements in terms of NMR subcomponents, wherein each NMR subcomponent is a product of an NMR coefficient and a constituent volume;
   expressing the at least one additional well log measurement in terms of well log subcomponents; and
   simultaneously inverting the expressed NMR measurements and the expressed at least one additional well log measurement for the NMR subcomponents to yield the amount.

2. The method of claim 1, wherein the region of investigation is in an earth formation or in a downhole tool.

3. The method of claim 1, wherein the NMR coefficient is a function of at least one of T1, T2, T1/T2, hydrogen index, and D.

4. The method of claim 1, wherein the at least one additional well log measurement is selected from the group consisting of density, resistivity, neutron porosity, sonic, and dielectric logging.

5. The method of claim 1, wherein each well log subcomponent is a product of a well log coefficient and a constituent volume.

6. The method of claim 1, further comprising determining a well log coefficient associated with each well log subcomponent.

7. The method of claim 1, wherein the inverting is based on a fluid model.

8. The method of claim 1, wherein the inverting is independent of any fluid model.

9. The method of claim 1, wherein each NMR subcomponent corresponds to a region on a multi-dimensional map having axes that correspond to NMR properties.

10. The method of claim 9, wherein the NMR properties include D, T1, T2, or any function of one or more of those properties.

11. The method of claim 9, wherein a parameter is determined from the multi-dimensional map and that parameter is used to determine a well log coefficient associated with each well log subcomponent.

12. The method of claim 11, wherein the parameter is used as a weighting coefficient in a weighted sum of contributions from constituent fluids.

13. The method of claim 12, wherein the weighted sum is used in the inverting.

14. The method of claim 1, wherein the amount includes constituent volumes, masses, or saturations.

15. The method of claim 1, wherein the NMR measurements comprise spin echo data or diffusion editing NMR data.

16. A logging system, comprising: a downhole tool adapted to be disposed within a wellbore, wherein the downhole tool comprises:
   an NMR measurement tool configured to obtain NMR measurements within an investigation region, and
   at least one additional well log measurement tool configured to obtain at least one additional well log measurement within the investigation region; and a processing system configured to:
   express the NMR measurements in terms of NMR subcomponents, wherein each NMR subcomponent is a product of an NMR coefficient and a constituent volume,
   express the well log measurement in terms of well log subcomponents, and
   invert the expressed NMR measurements together with the expressed at least one additional well log measurement.

17. The logging system of claim 16, wherein the downhole tool is either a wireline tool or a while-drilling tool.

18. The logging system of claim 16, wherein the at least one additional well log measurement is selected from the group consisting of density, resistivity, neutron porosity, sonic, and dielectric logging.

19. The method of claim 16, wherein the processing system is located outside the wellbore.

* * * * *